(12) United States Patent
Shenoy et al.

(10) Patent No.: US 11,994,115 B2
(45) Date of Patent: May 28, 2024

(54) TURBOEXPANDER ISLANDING OPERATION

(71) Applicant: Sapphire Technologies, Inc., Cerritos, CA (US)

(72) Inventors: Suratkal P. Shenoy, Mission Viejo, CA (US); Liping Zheng, Buena Park, CA (US); Jeremy Liu, Norwalk, CA (US); Freddie Sarhan, Anaheim, CA (US)

(73) Assignee: Sapphire Technologies, Inc., Cerritos, CA (US)

( * ) Notice: Subject to any disclaimer, the term of this patent is extended or adjusted under 35 U.S.C. 154(b) by 0 days.

(21) Appl. No.: 17/804,265

(22) Filed: May 26, 2022

(65) Prior Publication Data

US 2023/0383729 A1    Nov. 30, 2023

(51) Int. Cl.
*F03D 9/25* (2016.01)
*F03D 9/17* (2016.01)
*H02J 3/38* (2006.01)

(52) U.S. Cl.
CPC ............... *F03D 9/255* (2017.02); *F03D 9/17* (2016.05); *H02J 3/381* (2013.01); *H02J 3/388* (2020.01); *F05B 2220/20* (2013.01); *F05B 2220/602* (2013.01); *F05B 2220/7062* (2013.01)

(58) Field of Classification Search
CPC ........ H02J 3/381; H02J 3/388; F05B 2220/60
See application file for complete search history.

(56) References Cited

U.S. PATENT DOCUMENTS

| | | | |
|---|---|---|---|
| 5,689,175 A | 11/1997 | Hanson et al. | |
| 7,408,268 B1* | 8/2008 | Nocentini | H02J 3/38 307/16 |
| 7,638,892 B2 | 12/2009 | Myers | |
| 8,146,360 B2 | 4/2012 | Myers et al. | |
| 8,384,232 B2 | 2/2013 | Myers et al. | |
| 8,400,005 B2 | 3/2013 | Huber et al. | |
| 8,739,538 B2 | 6/2014 | Myers et al. | |
| 8,839,622 B2 | 9/2014 | Myers et al. | |
| 2002/0060556 A1* | 5/2002 | Wall | H02J 3/38 322/29 |
| 2002/0190695 A1* | 12/2002 | Wall | H02J 1/14 322/17 |
| 2004/0135436 A1* | 7/2004 | Gilbreth | H02J 1/14 307/18 |
| 2011/0103110 A1* | 5/2011 | Godridge | H02M 7/53875 363/74 |

(Continued)

*Primary Examiner* — Sean Gugger
(74) *Attorney, Agent, or Firm* — Fish & Richardson P.C.

(57) ABSTRACT

A turboexpander can operate as a microgrid electric generator for islanding operations. The turboexpander can recover energy lost during a pressure letdown sequence to generate electricity. Pressurized process gas can cause a turbine to rotate, thereby rotating a rotor within a stator of the turboexpander. A power electronics can include an islanding mode inverter to output an alternating current that comprises a frequency and an amplitude compatible with powering a load. The power electronics can include a battery that is charged by the turboexpander and can provide power for starting up the turboexpander. The power electrics can include a bidirectional inverter to send excess power from the turboexpander to a power grid and to receive power from the power grid for start-up.

20 Claims, 6 Drawing Sheets

(56) References Cited

U.S. PATENT DOCUMENTS

| | | |
|---|---|---|
| 2012/0013125 A1 | 1/2012 | Myers et al. |
| 2013/0286591 A1 | 10/2013 | Myers et al. |
| 2017/0214335 A1* | 7/2017 | Basic ................ H02M 7/48 |
| 2019/0044335 A1* | 2/2019 | Soverns .............. H02J 3/18 |

* cited by examiner

TURBOEXPANDER ISLANDING OPERATION

BACKGROUND

The efficient and effective movement of gases from producing regions to consumption regions uses an extensive and elaborate transportation system. Gases transported via pipelines can be pressurized and can traverse long distances through pipelines at high pressures. For example, natural gas that is transported through pipelines travels at high pressure in the pipeline. Natural gas is one of the principal sources of energy for many of our day-to-day needs and activities. Natural gas is an attractive fossil fuel for its abundance and relative cleanliness. As another example, hydrogen can also be transported at high pressures using pipelines. Hydrogen is a rapidly expanding global energy storage market. Hydrogen is used in many manufacturing processes from petroleum refining to food processing. Hydrogen is also used as a fuel source for gas turbines and in a broad range of fuels cells to generate electricity in industrial and consumer transportation sectors. Other gases can also be transported through pipelines at high pressures, including propane, oxygen, carbon dioxide, and others.

SUMMARY

Aspects of the embodiments include an apparatus that includes an electric generator. The electric generator includes a turbine wheel configured to receive process gas and rotate in response to expansion of the process gas flowing into an inlet of the turbine wheel and out of an outlet of the turbine wheel, a rotor coupled to the turbine wheel and configured to rotate with the turbine wheel, and a stationary stator, the electric generator to generate an alternating current upon rotation of the rotor within the stator. The apparatus includes a power converter circuit coupled to an electrical output of the electric generator, the power converter circuit to convert alternating current from the electric generator into direct current; and an islanding mode inverter circuit coupled to an electrical output of the rectifier circuit, the inverter circuit to convert direct current from the rectifier circuit into an alternating current that comprises a frequency and an amplitude to provide power to a load.

Aspects of the embodiments include a system comprising an electric generator and a power electronics. The electric generator includes a turbine wheel configured to receive process gas and rotate in response to expansion of the process gas flowing into an inlet of the turbine wheel and out of an outlet of the turbine wheel, a rotor coupled to the turbine wheel and configured to rotate with the turbine wheel, and a stationary stator, the electric generator to generate an alternating current upon rotation of the rotor within the stator. The power electronics includes a power converter circuit coupled to an electrical output of the electric generator, the power converter circuit to convert alternating current from the electric generator into direct current; and an islanding mode inverter circuit coupled to an electrical output of the rectifier circuit, the inverter circuit to convert direct current from the rectifier circuit into an alternating current that comprises a frequency and an amplitude to provide power to a load.

Some aspects of the embodiments include a brake resistor rectifier coupled to the electrical output of the electric generator; and a brake resistor assembly coupled to the output of the brake resistor rectifier.

In some implementations of the embodiments, the brake resistor assembly comprises a speed controlled, current regulated brake resistor.

Some aspects of the embodiments include a battery coupled to the electric generator, the battery to store power received from the electric generator and to provide power to rotate the rotor within the stator.

In some implementations of the embodiments, the battery is coupled to the power converter circuit, the power converter circuit to receive alternating current from the electric generator and convert the alternating current to a direct current for storage in the battery; and receive direct current from the battery and convert the direct current into alternating current to power the rotor.

Some aspects of the embodiments include a bidirectional inverter including the islanding mode inverter circuit; and an active grid inverter to convert direct current into alternating current that comprises a frequency and amplitude compatible with a power grid.

In some implementations of the embodiments, the bidirectional inverter is to provide power to the load and to provide excess power to the power grid.

In some implementations of the embodiments, the bidirectional inverter is to supply power from the power grid to the rotor to rotate the rotor within the stator prior to the process gas rotating the turbine wheel.

In some implementations of the embodiments, the electric generator comprises a three-phase permanent magnet synchronous generator.

Some aspects of the embodiments include a bidirectional inverter to direct current to the load and to direct excess current to a power grid.

In some implementations of the embodiments, the bidirectional inverter comprises an active grid inverter to direct power to the power grid and to receive power from the power grid.

Aspects of the embodiments are directed to a method that includes causing gas to flow through a turbine wheel of an electric generator residing downstream of a flow control valve; generating electrical current by the electric generator; directing electrical current generated by the electric generator to an islanding mode power electronics; and directing electrical current from the islanding mode power electronics to a load.

Some aspects of the embodiments include directing excess electrical current by the electric generator generated not directed to the load to a power grid through an active grid inverter.

Some aspects of the embodiments include performing a start-up of the electric generator using power received by the power grid through the active grid inverter.

Some aspects of the embodiments include directing excess electrical current by the electric generator generated not directed to the load to a battery.

Some aspects of the embodiments include performing a start-up of the electric generator using power received from the battery.

In some implementations, the islanding mode inverter circuit comprises a circuitry to receive direct current on a DC bus; convert the direct current to alternating current; and condition the alternating current into a frequency and amplitude compatible with the load.

Some aspects of the embodiments include a master controller circuit to control current flow to a brake resistor during a fault condition.

Some aspects of the embodiments include an active rectifier electrically connected between the electric generator and the brake resistor, the master controller to activate the active rectifier upon detecting a fault condition to direct current from the electric generator to the brake resistor based on the presence of the fault condition.

BRIEF DESCRIPTION OF THE DRAWINGS

Like reference symbols in the various drawings indicate like elements. Drawings not to scale.

DETAILED DESCRIPTION

Natural gas, hydrogen, and other process gases are pressurized to facilitate efficient transportation in pipelines that are sometimes many miles long. The pipelines, for example, transport gasses from production sites (e.g., wells) to processing facilities and from processing facilities to local distribution networks, such as regional, city or district networks or on-site industrial plants networks. To deliver the gas safely through local distribution networks and for use, the process gas is depressurized to lower levels (often using pressure regulators). The pressure is stepped down at pressure letdown (PLD) stations for delivery to industrial, commercial, and residential end users. The PLD stations use regulating valves to achieve the required pressure drop, but also waste significant amounts of energy in the process. Additional regulating valves can be used at other locations for pressure control, such as in the pipelines between the production and processing facilities, within the sub-processes of the processing facilities, and within the end user's processes and piping. A turboexpander generator can be installed in parallel to the regulating valve to recover the wasted energy from pressure reduction and produce electrical power. The electrical power can be directed to a power grid or elsewhere. Along the same lines, a turboexpander generator can be installed at a gas storage facility upstream of one or more storage tanks to recover high pressure gasses dispensed from a tanker truck, through the turboexpander generator, to the storage tanks. The turboexpander generator is relevant in other applications, such as in a hydrogen liquefaction process where gaseous hydrogen that has been cooled and pressurized is expanded to a liquid state. The expansion can be performed through a turboexpander generator to recover the wasted energy from the expansion and produce electrical power. As above, the electrical power can be directed to a power grid or elsewhere, such as used to power compressors or other components of the liquefaction process. In each instance, by recovering lost energy from natural gas and hydrogen pressure letdown applications, the turboexpander can generate electricity while also reducing $CO_2$ emissions, increasing overall plant efficiency, offsetting electrical costs, and generating additional revenue.

The power grid that the turboexpander can supply power to (and draw power from) can be a national or regional power grid, a local power grid for a city or district, or a small grid, local grid, or microgrid, such as an on-site grid that supplies power to a building, campus, industrial manufacturing or processing plant, or neighborhood.

Figure 1:
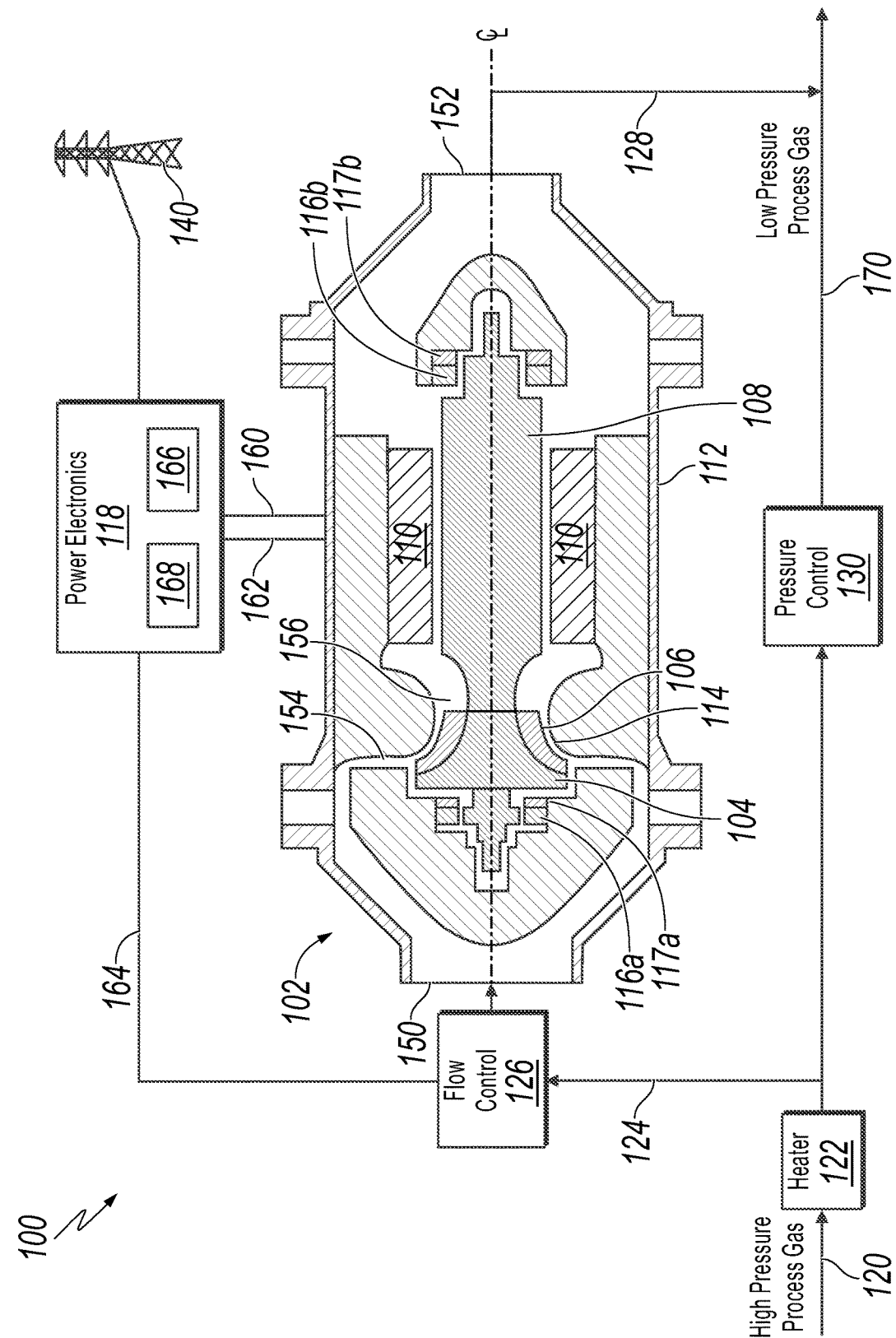
FIG. 1 is a schematic diagram of an electric power generation system coupled to a power grid in accordance with embodiments of the present disclosure.

FIG. 1 is a schematic diagram of an electric power generation system 100 coupled to a power grid 140 in accordance with embodiments of the present disclosure. The electric power generation system 100 can be added at a PLD station to capture energy from gas expansion from the PLD process, or in any of the other applications described above. The electric power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by generating electrical energy from rotational kinetic energy derived from expansion of a gas through a turbine wheel 104. For example, rotation of the turbine wheel 104 can be used to rotate a rotor 108 within a stator 110, which then generates electrical energy.

FIG. 1 is a schematic diagram of an electric power generation system 100 coupled to a power grid 140 in accordance with embodiments of the present disclosure. The electric power generation system 100 can be added at a PLD station to capture energy from gas expansion from the PLD process. The electric power generation system 100 includes a turboexpander 102 in parallel with a pressure control valve 130. The turboexpander 102 is arranged axially so that the turboexpander 102 can be mounted in-line with a pipe. The turboexpander 102 acts as an electric generator by generating electrical energy from rotational kinetic energy derived from expansion of a gas through a turbine wheel 104. For example, rotation of the turbine wheel 104 can be used to rotate a rotor 108 within a stator 110, which then generates electrical energy.

The turboexpander 102 can include a high-performance, high-speed permanent magnet generator. In certain embodiments, the turboexpander 102 includes an a radial in-flow expansion turbine wheel 104. Turboexpander 102 can also include low loss active magnetic bearings (AMBs) 116a,b. The rotor assembly can include permanent magnet section with the turbine wheel 104 mounted directly to the rotor hub. The rotor 108 can be levitated by the magnetic bearing system creating a frictionless (or near frictionless) interface between dynamic and static components. The AMBs 116a,b facilitate a lossless (or near lossless) rotation of the rotor 108.

The turboexpander 102 is shown to have the process gas flow through the system, which cools the generator section and eliminates the need for auxiliary cooling equipment. In some embodiments, non-flow-through overhung systems can also be implemented. The power electronics 118 for turboexpander combines a Variable Speed Drive (VSD) 166 and Magnetic Bearing Controller (MBC) 168 into one cabinet, in some implementations. The VSD allows for a consistent and clean delivery of generated power from the turboexpander 102 to a power grid 140. The VSD 166 regulates the frequency and amplitude of the generated current to match the local grid. After expansion, the gas exits the turboexpander 102 along the same axial path for downstream processes.

The turboexpander 102 is shown as having a flow-through configuration. The flow-through configuration permits process gas to flow from an inlet side of the turboexpander 102 to an outlet side of the turboexpander 102. The gas flows into a radial gas inlet 154 to a turbine wheel 104 and an axial gas outlet 156 from the turbine wheel 104. The gas then flow through the generator and out of the outlet 156, where the gas rejoins the gas pipeline 170. Generally, high pressure process gas 120 is directed to flow into the turboexpander 102 through a flow control system 126. The flow control system 126 includes a flow or mass control valve and an emergency shut off valve. Flow control system 126 can be controlled electrically from power electronics 118 by control line 164. In embodiments, the turboexpander housing 112 is hermetically sealed. As mentioned above, the turboexpander can be non-flow-through and overhung without deviating from the scope of this disclosure. The high pressure process gas 120 is expanded by flowing through the turbine wheel 104, resulting in a pressure letdown of the process gas. Lower pressure process gas 128 exits the turboexpander. The expansion of the high pressure process gas 120 through the turbine wheel 104 causes the turbine wheel 104 to rotate, which causes the rotor 108 to rotate. The rotation of the rotor 108 within the stator 110 generates electrical energy. The turboexpander 102 achieves the desired pressure letdown and captures the energy from the pressure letdown to generate electricity. A pressure control valve 130, such as a conventional pressure regulator, can be installed in parallel to the turboexpander 102. The pressure control valve 130 can be used to control the pressure of the high pressure process gas 120 that flows through the turboexpander. Any excess high pressure process gas that is not directed into the turboexpander can be directed through the pressure control valve 130.

In some embodiments, a heater 122 can heat the high pressure process gas 120 prior to flowing the gas into the turboexpander 102. For example, if the expansion of the gas through the turbine wheel 104 lowers the temperature of the process gas to a point where moisture in the gas freezes at the turbine wheel or other downstream locations in the pipeline, the pressurized process gas 120 can be heated by heater 122. Heated high pressure process gas 124 can then be directed into the turboexpander 102. The heating of the process gas can prevent freezing moisture as the gas expands and its temperature drops.

The turboexpander 102 includes a turbine wheel 104. The turbine wheel 104 is shown as a radial inflow turbine wheel, though other configurations are within the scope of this disclosure, such as axial flow turbine wheels. In this example, heated high pressure process gas 124 is received from an inlet conduit 150 of the housing 112 enters a radially oriented inlet 154 of the turbine wheel 104. In certain embodiments, the fluid flows through an inlet conduit 150 and is diverted by a flow diverter to a radial inlet 154 that directs the flow into the radial inflow of the turbine wheel 104. After expanding, the lower pressure process gas exits the turbine wheel 104 from an axially oriented outlet 156 to outlet conduit 152 of the housing 112.

The turbine wheel 104 can be directly affixed to the rotor 108, or to an intermediate common shaft, for example, by fasteners, rigid drive shaft, welding, or other manner. For example, the turbine wheel 104 may be received at an end of the rotor 108, and held to the rotor 108 with a shaft. The shaft threads into the rotor 108 at one end, and at the other, captures the turbine wheel 104 between the end of rotor 108 and a nut threadingly received on the shaft. The turbine wheel 104 and rotor 108 can be coupled without a gearbox and rotate at the same speed. In other instances, the turbine wheel 104 can be indirectly coupled to the rotor 108, for example, by a gear train, clutch mechanism, or other manner.

The turbine wheel 104 includes a plurality of turbine wheel blades 106 extending outwardly from a hub and that react with the expanding process gas to cause the turbine wheel 104 to rotate. FIG. 1 shows an unshrouded turbine wheel, in which each of the turbine blades 106 has an exposed, generally radially oriented blade tip extending between the radial inlet 154 and axial outlet 156. As discussed in more detail below, the blade tips substantially seal against a shroud 114 on the interior of the housing 112. In certain instances, the turbine wheel 104 is a shrouded turbine wheel.

In configurations with an un-shrouded turbine wheel 104, the housing 112 includes an inwardly oriented shroud 114 that resides closely adjacent to, and at most times during operation, out of contact with the turbine wheel blades 106. The close proximity of the turbine wheel blades 106 and shroud 114 substantially seals against passage of process gas therebetween, as the process gas flows through the turbine wheel 104. Although some amount of the process gas may leak or pass between the turbine wheel blades 106 and the shroud 114, the leakage is insubstantial in the operation of the turbine wheel 104. In certain instances, the leakage can be commensurate with other similar unshrouded-turbine/shroud-surface interfaces, using conventional tolerances between the turbine wheel blades 106 and the shroud 114. The amount of leakage that is considered acceptable leakage may be predetermined. The operational parameters of the turbine generator may be optimized to reduce the leakage. In embodiments, the housing 112 is hermetically sealed to prevent process gases from escaping the radial inlet 154 of the turbine wheel 104.

The shroud 114 may reside at a specified distance away from the turbine wheel blades 106, and is maintained at a distance away from the turbine wheel blades 106 during operation of the turboexpander 102 by using magnetic positioning devices, including active magnetic bearings and position sensors.

Bearings 116a and 116b are arranged to rotatably support the rotor 108 and turbine wheel 104 relative to the stator 110 and the shroud 114. The turbine wheel 104 is supported in a cantilevered manner by the bearings 116a and 116b. In embodiments, the turbine wheel 104 may be supported in a non-cantilevered manner and bearings 116a and 116b may be located on the outlet side of turbine wheel 104. In certain instances, one or more of the bearings 116a or 116b can include ball bearings, needle bearings, magnetic bearings, foil bearings, journal bearings, or others.

Bearings 116a and 116b may be a combination radial and thrust bearing, supporting the rotor 108 in radial and axial directions. Other configurations could be utilized. The bearings 116a and 116b need not be the same types of bearings.

In the embodiments in which the bearings 116a and 116b are magnetic bearings, a magnetic bearing controller (MBC) 168 is used to control the magnetic bearings 116a and 116b. Position sensors 117a, 117b can be used to detect the position or changes in the position of the turbine wheel 104 and/or rotor 108 relative to the housing 112 or other reference point (such as a predetermined value). Position sensors 117a, 117b can detect axial and/or radial displacement. The magnetic bearing 116a and/or 116b can respond to the information from the positions sensors 117a, 117b and adjust for the detected displacement, if necessary. The MBC 168 may receive information from the position sensor(s) 117a, 117b and process that information to provide control signals to the magnetic bearings 116a, 116b. MBC 168 can communicate with the various components of the turboexpander 102 across a communications channel 162.

The use of magnetic bearings 116a, 116b and position sensors 117a, 117b to maintain and/or adjust the position of the turbine wheel blades 106 such that the turbine wheel blades 106 stay in close proximity to the shroud 114 permits the turboexpander 102 to operate without the need for seals (e.g., without the need for dynamic seals). The use of the active magnetic bearings 116a,b in the turboexpander 102 eliminates physical contact between rotating and stationary components, as well as eliminate lubrication, lubrication systems, and seals.

The turboexpander 102 may include one or more backup bearings. For example, at start-up and shut-down or in the event of a power outage that affects the operation of the magnetic bearings 116a and 116b, bearings may be used to rotatably support the turbine wheel 104 during that period of time. The backup bearings and may include ball bearings, needle bearings, journal bearings, or the like. As mentioned previously, the turboexpander 102 is configured to generate electricity in response to the rotation of the rotor 108. In certain instances, the rotor 108 can include one or more permanent magnets. The stator 110 includes a plurality of conductive coils. Electrical current is generated by the rotation of the magnet within the coils of the stator 110. The rotor 108 and stator 110 can be configured as a synchronous, permanent magnet, multiphase alternating current (AC) generator. The electrical output 160 can be a three-phase output, for example. In certain instances, stator 110 may include a plurality of coils (e.g., three or six coils for a three-phase AC output). When the rotor 108 is rotated, a voltage is induced in the stator coil. At any instant, the magnitude of the voltage induced in coils is proportional to the rate at which the magnetic field encircled by the coil is changing with time (i.e., the rate at which the magnetic field is passing the two sides of the coil). In instances where the rotor 108 is coupled to rotate at the same speed as the turbine wheel 104, the turboexpander 102 is configured to generate electricity at that speed. Such a turboexpander 102 is what is referred to as a "high speed" turbine generator. For example, in embodiments, the turboexpander 102 can produce up to 280 kW at a continuous speed of 30,000 rpm. In embodiments, the turboexpander can produce on the order of 350 kW at higher rotational speeds (e.g., on the order of 35,000 rpm).

In some embodiments, the design of the turbine wheel 104, rotor 108, and/or stator 110 can be based on a desired parameter of the output gas from the turboexpander 102. For example, the design of the rotor and stator can be based on a desired temperature of the gas 128.

The turboexpander 102 can be coupled to a power electronics 118. Power electronics 118 can include a variable speed drive (VSD) 166 (or variable frequency drive) and the magnetic bearing controller (MBC) 168 (discussed above).

The electrical output 160 of the turboexpander 102 is connected to the VSD 166, which can be programmed to specific power requirements. The VSD 166 can include an insulated-gate bipolar transistor (IGBT) rectifier to convert the variable frequency, high voltage output from the turboexpander 102 to a direct current (DC). The rectifier 210 can be a three-phase rectifier for three-phase AC input current. An inverter then converts the DC from the rectifier AC for supplying to the power grid 140. The inverter can convert the DC to 380 VAC-480 VAC at 50 to 60 Hz for delivery to the power grid. The specific output of the VSD 166 depends on the power grid and application. Other conversion values are within the scope of this disclosure. The VSD 166 matches its output to the power grid 140 by sampling the grid voltage and frequency, and then changing the output voltage and frequency of the inverter to match the sampled power grid voltage and frequency.

The turboexpander 102 is also connected to the MBC 168 in the power electronics 118. The MBC 168 constantly monitors position, current, temperature, and other parameters to ensure that the turboexpander 102 and the active magnetic bearings 116a and 116b are operating as desired. For example, the MBC 168 is coupled to position sensors 117a, 117b to monitor radial and axial position of the turbine wheel 104 and the rotor 108. The MBC 168 can control the magnetic bearings 116a, 116b to selectively change the stiffness and damping characteristics of the magnetic bearings 116a, 116b as a function of spin speed. The MBC 168 can also control synchronous cancellation, including automatic balancing control, adaptive vibration control, adaptive vibration rejection, and unbalance force rejection control.

Pressure let down systems convert shaft power from the process flow. The turboexpander can support islanding operations. The turboexpander can continue to provide power to a location in the event that a power grid supplying power to that location is interrupted. This disclosure describes components that can facilitate load matching between the shaft power created by the process gas flow at the pressure letdown station to load demands. In this way, the turboexpander can support microgrid functionality for islanding operations.

The turboexpander 102 described above includes example features that are implementation-specific. Certain features may be changed, added, removed, or redesigned without deviating from the scope of this disclosure. For example, other types of bearings can be used instead of or in addition to AMBs, such as ball bearings, fluid film bearings, etc. Different designs of rotors and stators can be used, such as brushless DC, induction-type, etc. Other types of stator cooling architectures can be used, such as non-flow-through and overhung architectures.

Figure 2:
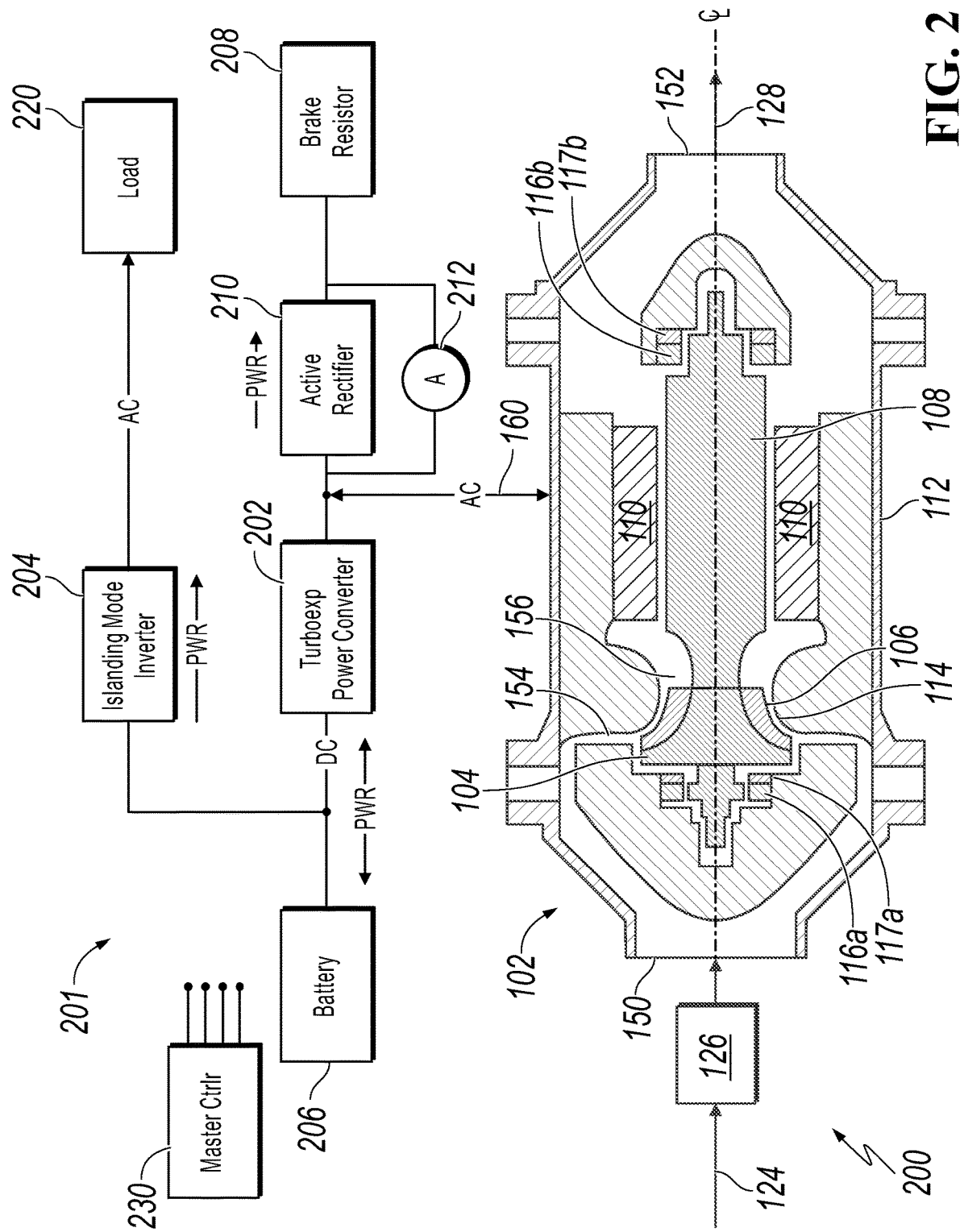
FIG. 2 is a schematic diagram of an example turboexpander system that supports islanding operations without a grid source in accordance with embodiments of the present disclosure.

FIG. 2 is a schematic diagram of an example turboexpander system 200 that supports islanding operations without a grid source in accordance with embodiments of the present disclosure. The turboexpander system 200 includes a turboexpander 102, as described above.

The turboexpander system 200 includes power electronics components 201 for supporting islanding operations. For example, a turboexpander power converter 202 electrically couples the electrical connection 160 of the turboexpander 102 to an islanding mode power electronics (PE) 204. A power converter can convert the AC power from the turboexpander 102 into DC, which can be stored in battery 206 or routed elsewhere on a DC bus. The turboexpander power converter 202 can convert the AC output of the turboexpander into DC to traverse the DC bus. In some embodiments, the turboexpander power converter 202 includes a rectifier circuit that includes electrical components that can convert AC to DC. The DC from the turboexpander power converter 202 is input into the islanding mode PE 204. The islanding mode PE 204 can convert the DC into AC that has a frequency and amplitude compatible with the load 220.

Load 220 can be appliances, printers, computers, lighting, telecommunications equipment, HVAC, air filtration, or other critical systems.

In embodiments, the islanding mode PE 204 can include an inverter circuit. The inverter circuit can convert DC from the turboexpander power converter 202 into AC. The inverter circuit can include, for example, circuit elements that convert the DC to an AC having frequency and amplitude (voltage) that is compatible with the load 220. The inverter circuit can also support multiple loads having different power demands and parameters.

The power electronics 201 can include a battery 206. Battery 206 can be coupled to the turboexpander 102 through the turboexpander power converter 202. The battery 206 can store power output from the turboexpander 102. For example, the AC from the electrical connection 160 can be converted to DC by the turboexpander power converter 202 and stored in battery 206.

In embodiments, the battery can facilitate "dark start" of the turboexpander 102. In the absence of a connected power grid as a power source for the turboexpander, the battery 206 can supply the necessary power to start the rotation of the rotor of the turboexpander 102 through bi-directional electrical connection 160. In some embodiments, the battery 206 can aid in getting the rotor started while the process gas starts to flow into the turboexpander inlet. After some time, the process gas flow is sufficient to bring the rotor up to speed, and the battery 206 can be disconnected from the turboexpander bi-directional connection 160. The ability to dark start the turboexpander allows the turboexpander to act as a microgrid without a power grid as a source of power.

A brake resistor assembly 208 is electrically connected to the electrical output 160 of the turboexpander 102 (e.g., the output of the generator). The brake resistor assembly 208 can have a tuned impedance to allow an efficient transfer of power from the turboexpander 102 to the brake resistor assembly 208. In embodiments, the brake resistor assembly 208 comprises a speed-controlled, current regulated brake resistor. The brake resistor assembly 208 can receive current from the turboexpander directly (AC) or through a rectifier circuit 210 (DC). The rectifier circuit 210 can convert the AC from the turboexpander 102 into DC. A current monitor 212 can be connected in parallel to the rectifier to monitor current from the turboexpander electrical output 160. In embodiments, rectifier circuit 210 includes an active rectifier circuit 210.

The battery 206 and brake resistor 208 can mitigate the turbocharger lag to provide a seamless operation during step load application and removal.

Load 220 can be any electrical load, including a critical load, at a location serviced by the turboexpander system 200. A critical load includes, but is not limited to, lighting systems, food storage systems, air conditioning/heating systems, communication systems, and other loads deemed critical to the location.

Figure 3:
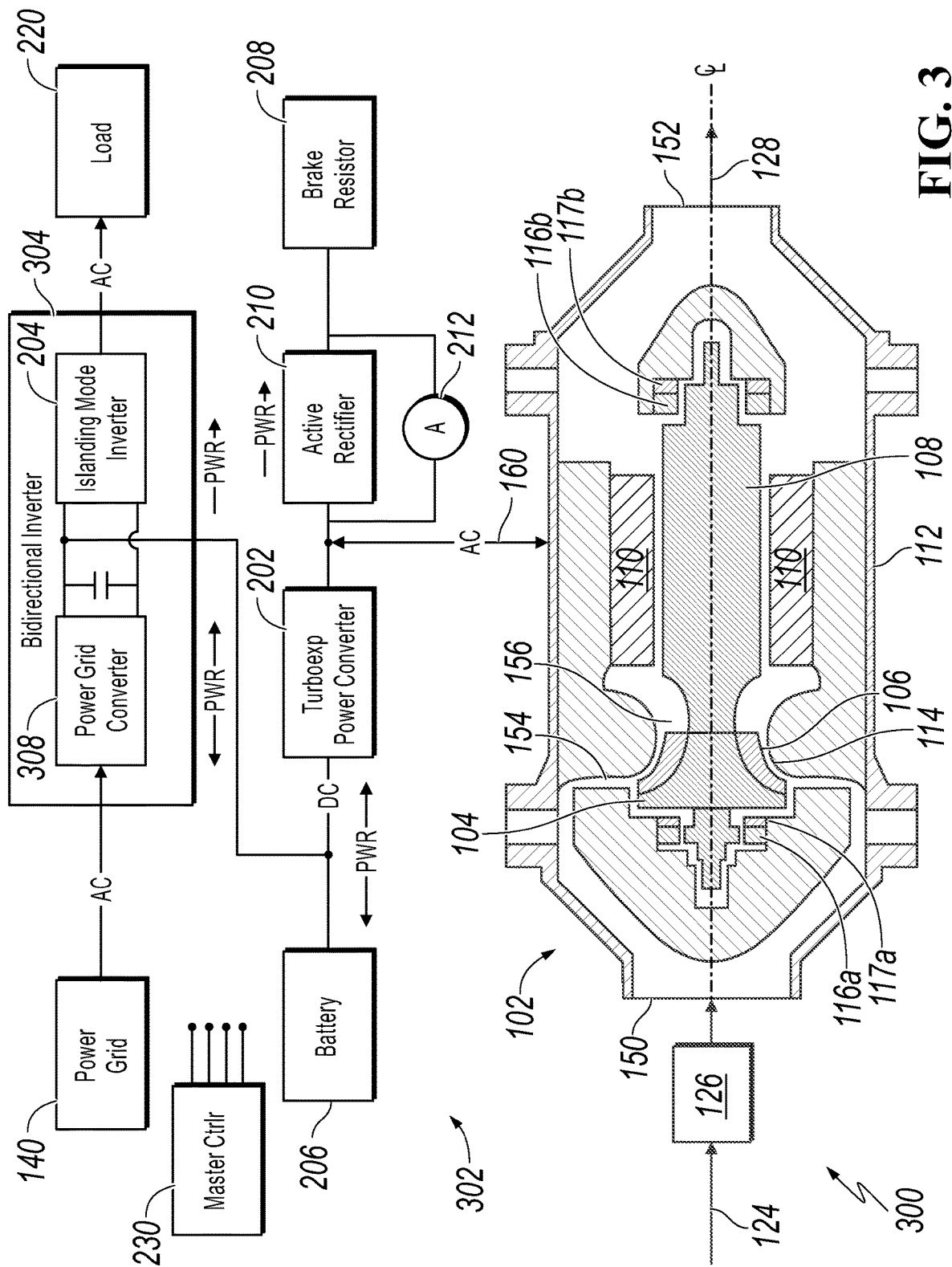
FIG. 3 is a schematic diagram of an example turboexpander system that includes a bidirectional inverter for islanding operation in accordance with embodiments of the present disclosure.

FIG. 3 is a schematic diagram of an example turboexpander system 300 that includes a bidirectional inverter for islanding operation in accordance with embodiments of the present disclosure. The embodiment shown in FIG. 3 is backed up by a power grid 140. For systems coupled to a power grid 140, the power electronics uses a bidirectional inverter system 304 described below. The bidirectional inverter system 304 facilitates powering the turboexpander 102 from the power grid 140 and also facilitates directing excess power generated by the turboexpander 102 beyond the load requirement of load 220 to be directed back to the power grid 140. In some embodiments, if the power grid 140 is lost, the turboexpander 102 can act as a microgrid or back-up power station to supply power to the load 220.

The turboexpander system 300 includes power electronics 302. Similar to the system 200 shown in FIG. 2, the turboexpander system 300 includes a turboexpander 102 that can generate electricity from the rotation of a rotor in a stator using process gas flow at a pressure letdown station (for example). Also similar to system 200, the turboexpander system 300 includes a brake resistor assembly 208 coupled to the electrical output 160 of the turboexpander 102. The brake resistor assembly 208 can have a tuned impedance to allow an efficient transfer of power from the turboexpander 102 to the brake resistor assembly 208. In embodiments, the brake resistor assembly 208 comprises a speed-controlled, current regulated brake resistor. The brake resistor assembly 208 can receive current from the turboexpander directly (AC) or through a rectifier circuit 210 (DC). The rectifier circuit 210 can convert the AC from the turboexpander 102 into DC. A current monitor 212 can be connected in parallel to the rectifier to monitor current from the turboexpander electrical output 160.

The power electronics 302 can include a battery 206. Battery 206 can be coupled to the turboexpander 102 through the turboexpander power converter 202. The battery 206 can store power output from the turboexpander 102. For example, the AC from the electrical output 160 can be converted to DC by the turboexpander power converter 202 and stored in battery 206. In embodiments, the battery can facilitate "dark start" of the turboexpander 102.

In embodiments, the power electronics 302 (and power electronics 201) can include a different type of power storage device. The power storage device can be charged using AC or DC. The power storage device in general can store power from the turboexpander 102, and in some embodiments, can store power from the power grid. In embodiments, the power storage device can be used to start the rotation of the rotor within the stator of the turboexpander 102 as process gas flow is built up during a pressure let down sequence or other gas flow process.

To support use of power from and delivery of power to the power grid 140, the power electronics 302 includes a bidirectional inverter system 304. Bidirectional inverter system 304 includes an islanding mode inverter 204 and a power grid converter 308. The islanding mode inverter 204 can receive DC from the turboexpander power converter 202 and convert the DC into a compatible AC for load 220 (or multiple loads).

The bidirectional inverter system 304 also includes a power grid converter 308. The power grid converter 308 can direct excess power not used by the load 220 to the power grid 140. The active grid inverter can include electrical components that can convert the DC from the turboexpander power converter 202 into AC having a frequency and amplitude compatible with the power grid 140.

The power grid inverter 308 can also receive AC from the power grid and convert the AC from the power grid 140 into DC for traversing DC bus to power converter 202. Power converter 202 can then convert the DC from the power grid inverter 308 into AC compatible with the turboexpander 102 to start the rotation of the rotor within the stator during start-up procedures. In embodiments, the battery 206 can also be charged using power from the power grid 140.

The battery 206 of turboexpander system 200 can act in a similar fashion as an uninterruptable power supply to continue providing power to the load 220 if the turboexpander 102 fails. Likewise, in FIG. 3, if the grid 140 fails, the turboexpander 102 and the battery 206 can supply power to the load 220. If both the grid 140 and the turboexpander 102 fail, the battery 206 can supply power to the load 220.

In any case, the islanding mode inverter 204 can condition the DC input to be AC power that mimics the grid 140 or the turboexpander 102 to supply power seamlessly to the load 220.

In any of the scenarios above, the power supplied to the load 220 by the battery 206 should mimic the grid power supplied to the load. The islanding mode inverter 204, therefore, includes the electronics to shape the power from the battery to mimic grid power. This way, the turboexpander systems can support seamless operation of loads using the battery 206 even if the grid 140 and the turboexpander 102 fail. Likewise, the battery 206 and the grid 140 can be supplied by the turboexpander 102. The electrical components described herein facilitate the ability to supply power to battery 206 and to grid 140 via turboexpander 102, while also ensuring that load 220 continues to receive power during grid failures and/or turboexpander failures.

In addition, the battery 206 should have sufficient charge or capacity to supply power to load 220 for some amount of time, to allow the grid 140 or turboexpander 102 to come back online.

A master controller 230 can provide power management control to various components, including the output voltage shaping, the output voltage control, the reactive and active load compensation, and other power control features. The master controller 230 can activate or deactivate or otherwise control active rectifiers, inverters, converters, etc., to provide power to the right component based on operational conditions. Master controller can be connected to and control turboexpander power converter 202, islanding mode inverter 204, brake resistor 208, active rectifier 210, and power grid converter 308. For example, a tripped breaker can signify that load 220 is lost. To prevent over-speed conditions at the turboexpander 102, the master controller 230 can activate active rectifier 210 to direct power from the turboexpander 102 to the brake resistor assembly 208. The master controller 230 can also redirect power to the power electronics after the over-speed or other fault condition has been reconciled. For example, if a breaker is tripped at the output of the power electronics, the master controller 230 can route power from the turboexpander 102 to the active rectifier 210 to allow the power to be dissipated by the brake resistor assembly 208. After the breaker is reset, the master controller 230 can reroute power from the turboexpander 102 to the power electronics for delivery to the load.

Figure 4A:
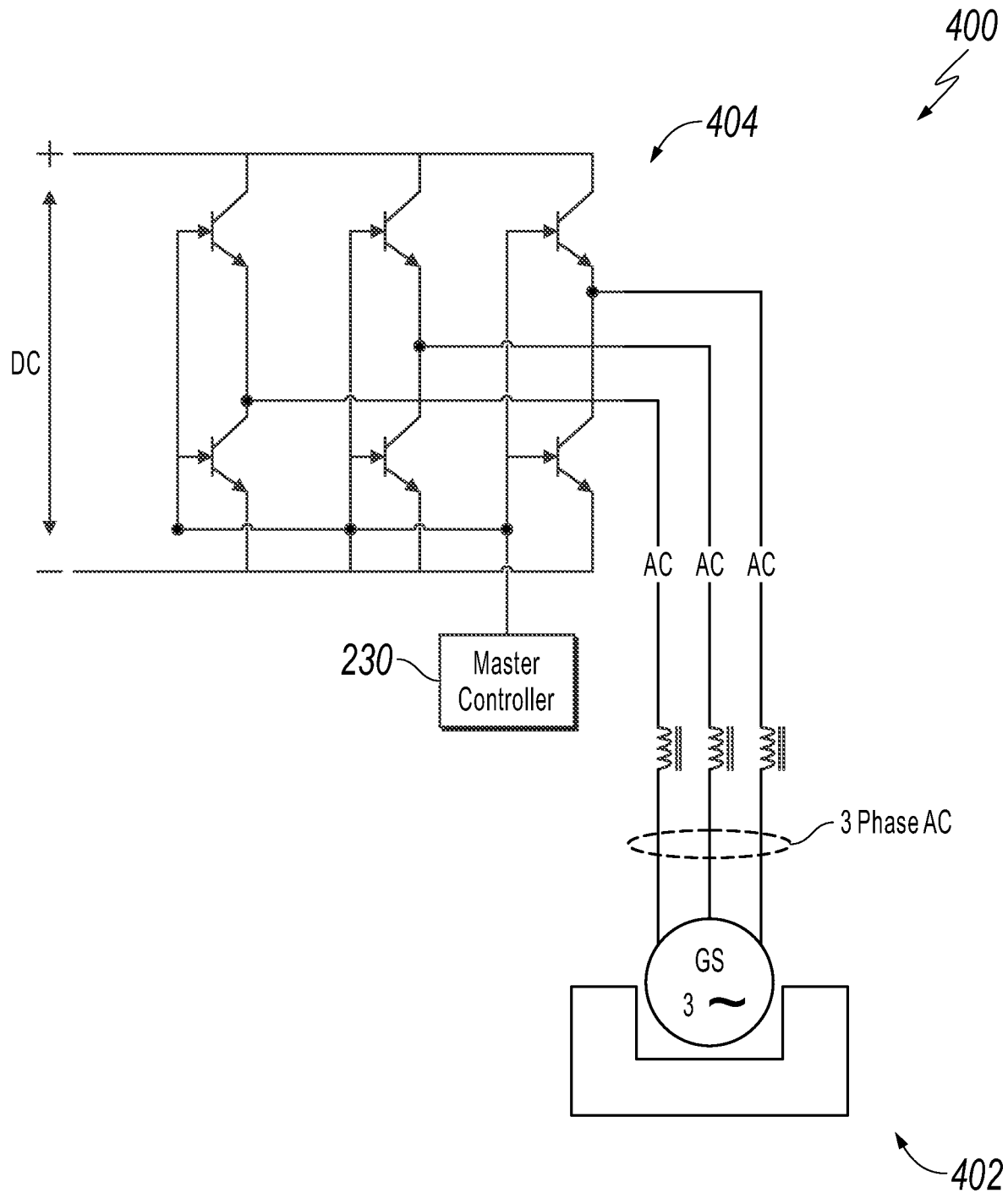
FIG. 4A is a schematic diagram of an example turboexpander converter in accordance with embodiments of the present disclosure.

FIG. 4A is a schematic diagram 400 of an example turboexpander converter in accordance with embodiments of the present disclosure. In FIG. 4A, the turboexpander 102 is simplified to be a three-phase permanent magnet synchronous alternating current generator 402. Though not shown, a current monitor can be coupled in parallel to the brake resistor assembly to monitor current flowing into the brake resistor(s). A turboexpander power converter 404, similar to turboexpander power convert 202 is shown. The turboexpander power converter 404 can be used to convert AC power from the generator 402 to DC power for the DC bus. DC power can be stored in battery 206 or sent to islanding mode inverter 204 or power grid converter 308.

The turboexpander power converter 404 can also convert DC power from the battery 206 or from power grid converter 308 into AC power to drive the turboexpander during start-up operations. Master controller 230 can be used to control the turboexpander power converter 404 to drive current either to or from the generator 402 based on operating conditions. For example, the master controller 230 can receive power management control information that causes the master controller 230 to control the turboexpander power converter 404 to drive current to the generator 402 from the battery 206 or grid 140 during start up. The master controller 230 can receive power management control information that causes the master controller 230 to control the turboexpander power converter 404 to drive current from the generator 402 to the DC bus for supplying power to the battery 206, grid 140, or load 220. For example, the master controller 230 can activate rectifiers in the turboexpander power converter 404 based on the presence or absence of a fault condition at the load 220 or grid 140.

Figure 4B:
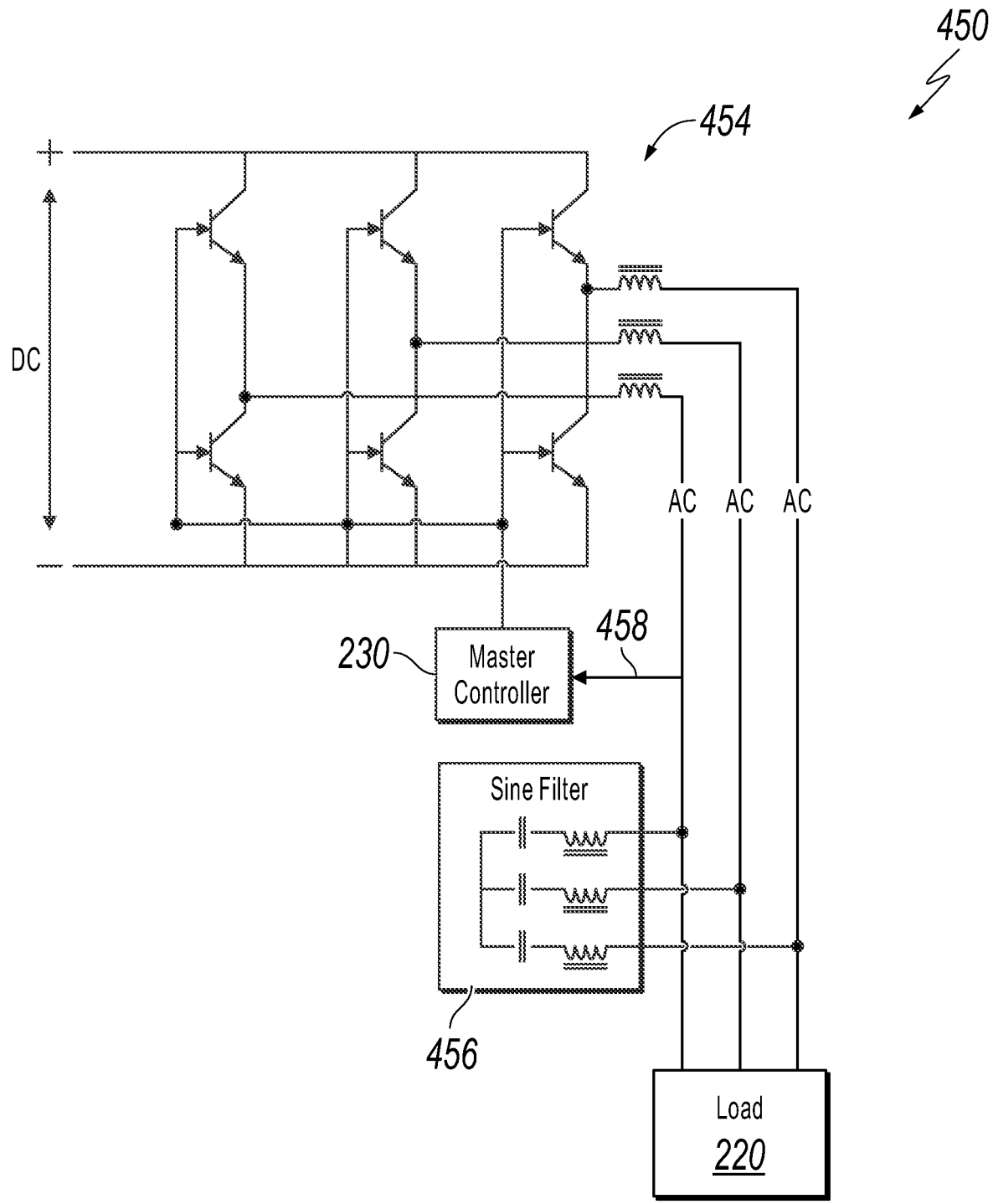
FIG. 4B is a schematic diagram of an example islanding mode inverter in accordance with embodiments of the present disclosure.

FIG. 4B is a schematic diagram 450 of an example islanding mode inverter 454 in accordance with embodiments of the present disclosure. Islanding mode inverter 454 is similar to islanding mode inverter 204. The islanding mode inverter 454 can change DC current to AC current to supply AC power to load 220. The islanding mode inverter 454 can condition the power that is output from the islanding mode inverter 454 to mimic grid power. For example, the islanding mode inverter can include electrical components to condition the AC power, including sine filter 456. The output power to the load 220 resembles the power provided to the load 220 by the grid 140 or the generator 402 so that if the grid is lost, the load 220 can continue to operate.

In one example embodiment, the master controller 230 can receive information 458 that signals to the master controller 230 to send battery power to the load through the islanding mode inverter 454. A tripped breaker can signal a fault at the grid or elsewhere that causes the master controller to cause battery 206 to provide power to load 220.

Figure 5:
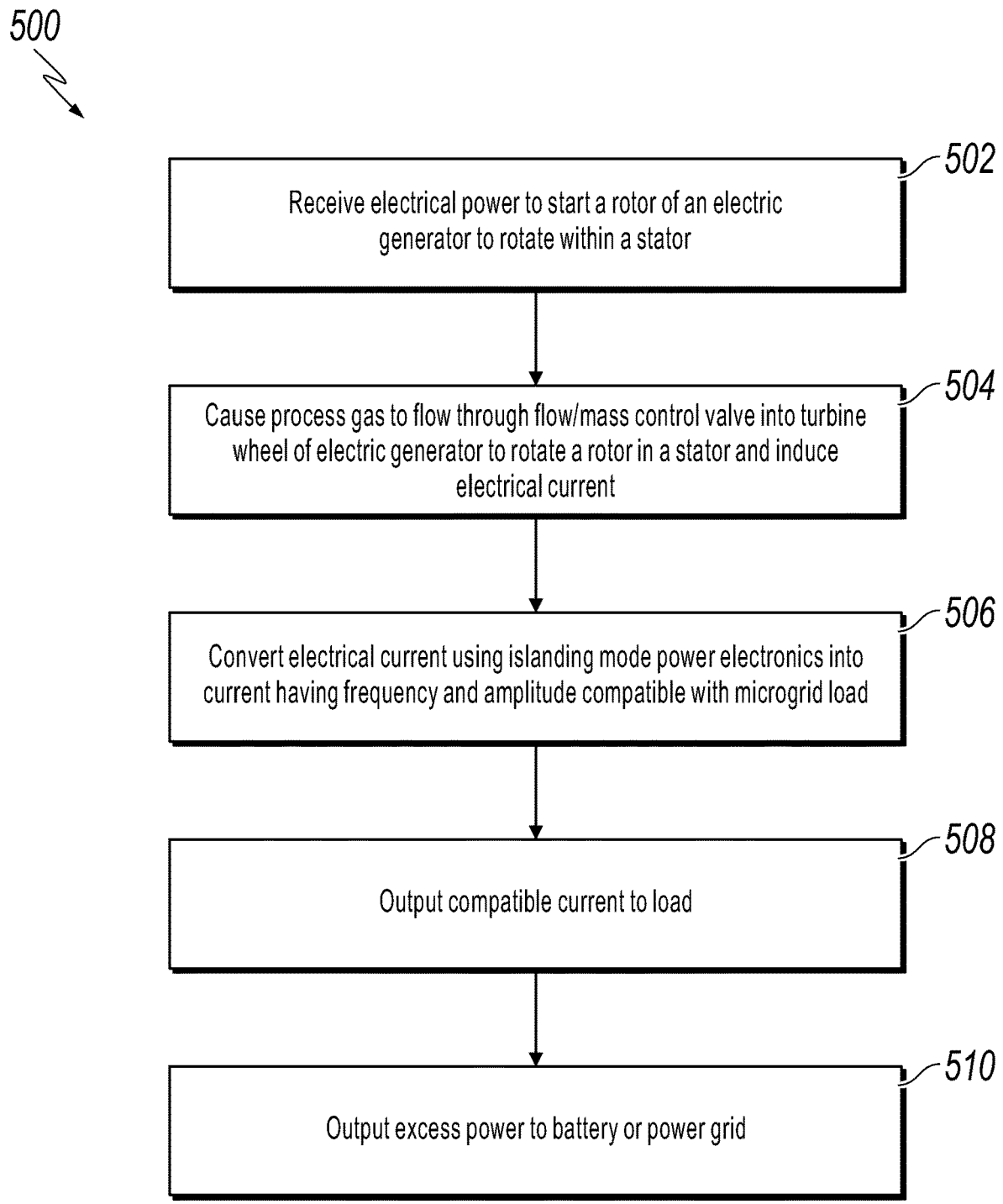
FIG. 5 is a process flow diagram for supporting islanding operation using a turboexpander in accordance with embodiments of the present disclosure.

FIG. 5 is a process flow diagram 500 for supporting islanding operation using a turboexpander in accordance with embodiments of the present disclosure. In some embodiments, a power source can be used to start up the rotation of a rotor within a stator of the turboexpander. (502). The power source can be a battery connected to the turboexpander or a power grid connected to the turboexpander. The power source can aid in getting the rotor up to speed while a process gas flow is building up to sufficient flow rates or mass to rotate the rotor at a desired speed to generate the desired output power. (504).

The load can be uncoupled from a power grid. The turboexpander provides power to the load during islanding operations, thereby acting as a microgrid. The turboexpander power electronics can include an islanding mode power electronics, such as an islanding mode inverter, to convert current originating from the turboexpander into a current that has a frequency and amplitude that is compatible with the load. (506). The output current of the turboexpander can be used to power a load. (508). Excess power that is not used by the load can be output to either a battery (or other power storage device) or to the power grid. If a power grid is coupled to the turboexpander, an active grid inverter can convert current originating from the turboexpander into a current having a frequency and amplitude compatible with the power grid.

The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment. In the foregoing specification, a detailed description has been given with reference to specific exemplary embodiments. It will, however, be evident that various modifications and changes may be made thereto without departing from the broader spirit and scope of the disclosure as set forth in the claims.

What is claimed is:

1. An apparatus comprising:
an electric generator comprising:
a process gas inlet configured to couple to a process gas pipeline and to receive high-pressure process gas from the process gas pipeline;
a turbine wheel configured to receive high-pressure process gas from the process gas inlet and rotate in response to expansion of the process gas flowing into an inlet of the turbine wheel and out of an outlet of the turbine wheel, the outlet of the turbine wheel to couple to a downstream process gas pipeline to transfer low pressure process gas downstream of the electric generator;
a rotor coupled to the turbine wheel and configured to rotate with the turbine wheel, and
a stationary stator, the electric generator to generate an alternating current upon rotation of the rotor within the stator;
a bidirectional power converter circuit coupled to an electrical output of the electric generator, the bidirectional power converter circuit to convert alternating current from the electric generator into direct current;
an islanding mode inverter circuit coupled to an electrical output of the bidirectional power converter circuit by a direct current (DC) bus, the islanding mode inverter circuit to convert direct current from the bidirectional power converter circuit into an alternating current that comprises a frequency and an amplitude to provide power to an electrical load;
an active grid inverter circuit coupled to the islanding mode inverter circuit and the bidirectional power converter circuit by the DC bus, the active grid inverter circuit configured to provide power for the electrical load and/or for the electric generator and is configured to provide power to a power grid from the electric generator;
wherein the electric generator is coupled in parallel to the electrical load and the power grid that supplies power to the electrical load, the apparatus further comprising:
a master controller to:
determine that the power grid is no longer supplying power to the electrical load, and
cause the islanding mode inverter to direct power, generated by the electric generator from expansion of high-pressure process gas received by the process gas pipeline, to the load based on the determination that the power grid is no longer supplying power to the electrical load;
wherein the apparatus further comprises:
a brake resistor active rectifier coupled to the electrical output of the electric generator; and
a brake resistor assembly coupled to an output of the brake resistor rectifier.

2. The apparatus of claim 1, wherein the brake resistor assembly comprises a speed controlled, current regulated brake resistor.

3. The apparatus of claim 1, further comprising a battery coupled to the electric generator, the battery to store power received from the electric generator and to provide power to rotate the rotor within the stator.

4. The apparatus of claim 3, wherein the battery is coupled to the bidirectional power converter circuit, the bidirectional power converter circuit to:
receive alternating current from the electric generator and convert the alternating current to a direct current for storage in the battery; and
receive direct current from the battery and convert the direct current into alternating current to power the rotor.

5. The apparatus of claim 3, wherein the battery is coupled to the islanding mode inverter by the DC bus, the master controller is configured to:
determine that the power grid is no longer supplying power to the electrical load, and
prior to directing power to the electrical load from the electric generator, the master controller to direct DC power from the battery to the islanding mode converter in response to the determination that the power grid is no longer supplying power; and
wherein the islanding mode inverter is configured to convert DC power from the battery to have a frequency and amplitude for the electrical load.

6. The apparatus of claim 1, wherein the bidirectional inverter is to provide power to the load and to provide excess power to the power grid.

7. The apparatus of claim 1, wherein the bidirectional inverter is to supply power from the power grid to the rotor to rotate the rotor within the stator prior to the process gas rotating the turbine wheel.

8. The apparatus of claim 1, wherein the islanding mode inverter circuit comprises a circuitry to:
receive direct current on a DC bus;
convert the direct current to alternating current; and
condition the alternating current into a frequency and amplitude compatible with the load.

9. The apparatus of claim 1, further comprising a master controller circuit to control current flow to a brake resistor during an overspeed condition of the electric generator.

10. The apparatus of claim 9, wherein the master controller is to activate the brake resistor active rectifier upon detecting the overspeed condition to direct current from the electric generator to the brake resistor based on the presence of the overspeed condition.

11. The apparatus of claim 1, wherein the electric generator comprises a three-phase permanent magnet synchronous generator.

12. The apparatus of claim 1, further comprising a current monitor electrically connected in parallel to the brake resistor active rectifier.

13. A system comprising:
an electric generator comprising:
a process gas inlet configured to couple to a process gas pipeline and to receive high-pressure process gas from the process gas pipeline;
a turbine wheel configured to receive high-pressure process gas from the process gas inlet and rotate in response to expansion of the process gas flowing into an inlet of the turbine wheel and out of an outlet of the turbine wheel, the outlet of the turbine wheel to couple to a downstream process gas pipeline to transfer low pressure process gas downstream of the electric generator,
a rotor coupled to the turbine wheel and configured to rotate with the turbine wheel, and
a stationary stator, the electric generator to generate an alternating current upon rotation of the rotor within the stator; and
a power electronics system comprising:
a bidirectional power converter circuit coupled to an electrical output of the electric generator, the bidirectional power converter circuit to convert alternating current from the electric generator into direct current; and an islanding mode inverter circuit coupled to an electrical output of the bidirectional power converter circuit by a direct current (DC) bus, the inverter circuit to convert direct current from the bidirectional power converter circuit into an alternating current that comprises a frequency and an amplitude to provide power to an electrical load;

an active grid inverter circuit coupled to the islanding mode inverter circuit and the bidirectional power converter circuit by the DC bus, the active grid inverter circuit configured to provide power for the electrical load and/or for the electric generator and is configured to provide power to a power grid from the electric generator;

wherein the power electronics system is coupled in parallel to the electrical load and the power grid that supplies power to the electrical load, the power electronics system further comprising:

a master controller to:
  determine that the power grid is no longer supplying power to the electrical load, and
  cause the islanding mode inverter to direct power, generated by the electric generator from expansion of high-pressure process gas received by the process gas pipeline, to the load based on the determination that the power grid is no longer supplying power to the electrical load;

wherein the apparatus further comprises:
  a brake resistor active rectifier coupled to the electrical output of the electric generator;
  a brake resistor assembly coupled to an output of the brake resistor rectifier; and wherein the master controller is to activate the brake resistor active rectifier upon detecting an overspeed condition to direct current from the electric generator to the brake resistor active rectifier based on the presence of the overspeed condition.

14. The system of claim 13, further comprising a battery coupled to the bidirectional power converter circuit by the DC bus, the bidirectional power converter circuit to:
  receive alternating current from the electric generator and convert the alternating current to a direct current for storage in the battery; and
  receive direct current from the battery and convert the direct current into alternating current to power the rotor.

15. The system of claim 14, wherein the battery is coupled to the islanding mode inverter, the master controller is configured to:
  determine that the power grid is no longer supplying power to the electrical load, and
  prior to directing power to the electrical load from the electric generator, the master controller to direct DC power from the battery to the islanding mode converter in response to the determination that the power grid is no longer supplying power; and
  wherein the islanding mode inverter is configured to convert DC power from the battery to have a frequency and amplitude for the electrical load.

16. The system of claim 13, further comprising a current monitor electrically coupled in parallel to the brake resistor active rectifier.

17. An apparatus comprising:
an electric generator comprising:
  a process gas inlet configured to couple to a process gas pipeline and to receive high-pressure process gas from the process gas pipeline;
  a turbine wheel configured to receive high-pressure process gas from the process gas inlet and rotate in response to expansion of the process gas flowing into an inlet of the turbine wheel and out of an outlet of the turbine wheel, the outlet of the turbine wheel to couple to a downstream process gas pipeline to transfer low pressure process gas downstream of the electric generator;
  a rotor coupled to the turbine wheel and configured to rotate with the turbine wheel, and
  a stationary stator, the electric generator to generate an alternating current upon rotation of the rotor within the stator;

a bidirectional power converter circuit coupled to an electrical output of the electric generator, the bidirectional power converter circuit to convert alternating current from the electric generator into direct current;

an islanding mode inverter circuit coupled to an electrical output of the bidirectional power converter circuit by a direct current (DC) bus, the inverter circuit to convert direct current from the bidirectional power converter circuit into an alternating current that comprises a frequency and an amplitude to provide power to an electrical load;

an active grid inverter circuit coupled to the islanding mode inverter circuit and the bidirectional power converter circuit by the DC bus, the active grid inverter circuit configured to provide power for the electrical load and/or for the electric generator and is configured to provide power to a power grid from the electric generator;

a brake resistor active rectifier coupled to the electrical output of the electric generator; and a brake resistor assembly coupled to an output of the brake resistor rectifier; and wherein the electric generator is coupled in parallel to the electrical load and the power grid that supplies power to the electrical load, the apparatus further comprising:

a master controller to:
  determine that the power grid is no longer supplying power to the electrical load,
  cause the islanding mode inverter to direct power, generated by the electric generator from expansion of high-pressure process gas received by the process gas pipeline, to the load based on the determination that the power grid is no longer supplying power to the electrical load; and
  to activate the brake resistor active rectifier upon detecting an overspeed condition in the electric generator to direct current from the electric generator to the brake resistor active rectifier based on the presence of the overspeed condition.

18. The apparatus of claim 17, further comprising a battery coupled to the bidirectional power converter circuit, the bidirectional power converter circuit to:
  receive alternating current from the electric generator and convert the alternating current to a direct current for storage in the battery; and
  receive direct current from the battery and convert the direct current into alternating current to power the rotor.

19. The apparatus of claim 18, wherein the battery is coupled to the islanding mode inverter, the master controller is configured to:
  determine that the power grid is no longer supplying power to the electrical load, and prior to directing power to the electrical load from the electric generator, the master controller to direct DC power from the battery to the islanding mode converter in response to the determination that the power grid is no longer supplying power; and wherein the islanding mode inverter is configured to convert DC power from the battery to have a frequency and amplitude for the electrical load.

20. The apparatus of claim 17, further comprising a current monitor electrically coupled in parallel to the brake resistor active rectifier.

* * * * *